United States Patent Office 2,720,503
Patented Oct. 11, 1955

2,720,503

ORGANO-MAGNESIUM HALIDE CATALYSTS FOR THE PREPARATION OF POLYESTERS

John W. Wellman, Kingsport, Tenn., assignor to Eastman Kodak Company, Rochester, N. Y., a corporation of New Jersey No Drawing. Application October 3, 1952,
Serial No. 313,073

13 Claims. (Cl. 260—75)

This invention relates to a process for preparing polyesters which comprises condensing a diester of a dicarboxylic acid with a polyhydroxy compound in the presence of at least one of a group of novel catalytic condensing agents which are known as Grignard reagents or magnesiéns and which are defined hereinbelow. These novel catalytic condensing agents can be advantageously employed in the preparation of linear polyesters wherein the dicarboxylic acid is an aromatic compound which does not contain any ethylenic (olefinic) unsaturation and the polyhydroxy compound is a dihydroxy compound. In preparing such linear polyesters it is advantageous to conduct the condensation in an inert atmosphere at an elevated temperature which is increased during the course of the condensation up to a temperature of from about 225° to about 310° C., the condensation being conducted during the latter stages thereof at a very low subatmospheric pressure.

This application contains subject matter disclosed to some extent in a copending application, Serial No. 143,594, filed February 10, 1950, by J. R. Caldwell, now U. S. Patent No. 2,614,120, dated October 14, 1952. This application also contains subject matter disclosed in other copending applications filed on even date herewith by J. R. Caldwell, Serial Nos. 313,061 through 313,071.

Various polyesters of dicarboxylic acids and polyhydroxy compounds are well known in the prior art and have been used, for example, in the manufacture of paints and varnishes. Moreover, prior art disclosures set forth various linear condensation polyesters derived from dihydroxy compounds and dibasic acids such as terephthalic acid which are capable of being drawn into fibers showing by characteristic X-ray patterns, orientation along the fiber axis. However, many of these linear polyesters possess a relatively low melting point and a fairly considerable solubility in various solvents whereby they are of restricted utility, especially in the textile field. These polyesters vary considerably in their characteristics, depending on the particular dicarboxylic acid and the particular polyhydroxy compound employed. Generally speaking, these polyesters have various physical characteristics which are not as satisfactory as could be desired.

The preparation of polyesters is well known in the prior art and involves the reaction of a dibasic dicarboxylic acid with a dihydric or polyhydric alcohol. It is advantageous to employ esters of the dicarboxylic acid whereby ester interchange takes place with the glycol or polyhydric alcohol to form a polyester and an alcohol. When using the ester interchange method, the time required to form the polyesters is generally considerably less than when the free dicarboxylic acid is employed. The long chain in the polyester is built up by a series of ester interchange reactions wherein the glycol displaces a relatively low-boiling alcohol component of the acid ester to form a glycol ester. During the last stages of the reaction, it is generally desirable to heat the condensing reaction mixture to a temperature of about 225°–275° C.

or higher in order to maintain the fluid state. For this reason, the properties of the catalytic condensing agent are very important.

A desirable catalytic condensing agent must be active enough to promote ester interchange at a temperature below the boiling point of the glycol or other polyhydric alcohol. At the same time, the catalyst must be stable at temperatures of 225°–310° or even higher if necessary. Furthermore, the catalyst must not cause decomposition or degradation of the polyester at these high temperatures.

In accordance with this invention, it has been found that certain compounds are especially valuable for use as catalytic condensing agents in the preparation of high melting linear polyesters. They have the general formula structure set forth below:

$$RMgHal$$

wherein R represents an aryl group of the benzene series containing from 6 to 9 carbon atoms or an alkyl radical containing from 1 to 6 carbon atoms, and Hal represents a halogen atom.

These novel catalysts can be advantageously employed in processes for preparing polyesters, which processes are described below. These novel catalysts are effective only when substantially anhydrous conditions are employed and no free acid is present to a sufficiently significant extent to destroy the catalyst compound; thus, when free acids are employed the acids are first reacted with a hydroxy compound (preferably the polyhydroxy compound to be employed in the polyesterification process) before the novel catalyst of this invention is added.

The novel catalysts can be made by reacting an alkyl or aryl halide with magnesium in the presence of an ether. This preparation is well known in the prior art and need not be elaborated upon. The examples set forth below illustrate the preparation of exemplary compounds of the Grignard reagent or magnesién type which constitute the novel catalysts of this invention.

Catalysts known in the prior art are in general not soluble in the reaction components. Such catalysts, e. g. activated magnesium or calcium, remain in the polyesters obtained and are difficult to remove in spinning or molding operations. The novel catalysts of this invention are not only soluble in the reactants being condensed but are much more active than such prior art catalysts. Polyesters obtained by suitable treatment employing these novel catalysts are free of heterogeneous matter and the small amount of magnesium derivatives remaining in them in no way detracts from the physical properties of these polyesters.

The novel catalysts of this invention give a very rapid reaction rate at all stages of the polyesterification process, including the final step where the molecular weight is built up. They are particularly valuable for the preparation of high melting polyesters from 1,6-hexanediol and 1,5-pentanediol. It is well known that these glycols have a tendency to decompose at temperatures above 250–260° C. and hence are difficult to use. With the novel catalysts described above polyester reactions employing these glycols can be carried out at temperatures up to 300° C. or even higher without excessive decomposition.

The novel catalysts can, in general, be employed for the preparation of substantially all polyesters involving an ester interchange reaction between a dicarboxylic acid ester and a glycol or glycol ester. The catalysts are especially valuable for the preparation of polyesters that melt above about 240° C., as for example, polyethylene terephthalate. The process of the invention is applicable to all of the polyesters described herein.

By employing the novel catalysts of this invention, the reaction rate of the polyesterification process can be increased by a factor which is generally from about 2 to 5 times the reaction rate obtainable when catalysts known in the prior are are employed. Moreover, the novel catalysts of this invention have the valuable characteristic of minimizing side reactions which have the tendency of causing considerable degradation of the polyester products at the relatively high temperatures employed in preparing highly polymeric polyesters. Furthermore, by employing these novel catalysts to increase the rate of condensation, the time available for possible decomposition of the high molecular weight polyester molecules being formed at high temperatures is appreciably reduced. Thus, by increasing the reaction rate, the time required to make a polyester is reduced which is quite important because at 250°–300° C. the degree of color formation and extent of deleterious side reactions is proportional to the time of heating.

The polyesters produced when employing these novel catalysts have greatly improved properties as compared to products obtained employing catalysts known in the prior art. The molecular weight is considerably higher whereby highly polymeric polyesters are obtained. The color of the polyesters obtained is excellent; the products can therefore be employed for purposes calling for white or colorless materials. The physical properties of the polyesters obtained are also superior. At high temperatures there is a great improvement in the inherent viscosities of linear polyesters which are suitable for melt spinning or extrusion whereby fibers, films, etc. can be produced having properties superior to those obtainable with known catalysts.

The herein described novel catalysts are especially valuable for the preparation of polyesters employing diesters of p,p'-sulfonyl dibenzoic acid as described in copending applications filed on even date herewith by J. R. Caldwell, Serial Nos. 313,061–313,068. Many of these polyesters are very high melting and the reaction must often be carried out at a temperature of 280°–300° C. or higher. It has been found that relatively few catalysts are effective at this temperature other than those described in this application.

It is an object of this invention to provide new and improved catalytic condensing agents for promoting the formation of improved polyesters in processes involving ester interchange and alcoholysis. A further object of this invention is to provide a new and improved method for the preparation of polyesters wherein such new and improved catalysts are employed. Other objects will become apparent elsewhere in this specification.

A broad aspect of this invention relates to a process for preparing a polyester which comprises condensing under substantially anhydrous conditions at an elevated temperature in an inert atmosphere a diester of a dicarboxylic acid with from about 1 to about 10 equivalent proportions of a polyhydroxy compound, in the presence of a catalytic condensing agent selected from the group consisting of those compounds having the formula:

RMgHal wherein R represents a substituent from the group consisting of an aryl radical containing from 6 to 9 carbon atoms and an alkyl radical containing from 1 to 6 carbon atoms and Hal represents a halogen atom, e. g. a Cl, Br or I atom.

More specifically, this invention relates to a process for preparing a polyester comprising (A) condensing under substantially anhydrous conditions an aromatic dicarboxylic acid diester having the formula:

R₁OOC—R₂—X—R₃—COOR₄ wherein R₁ and R₄ each represents a substituent selected from the group consisting of an alkyl radical containing from 1 to 10 carbon atoms and an omega-hydroxyalkyl radical containing from 2 to 12 carbon atoms, R₂ and R₃ each represents (CH₂)$_{n-1}$ wherein n is a positive integer of from 1 to 5 inclusive and X represents a divalent aromatic radical selected from the group having the following formulas:

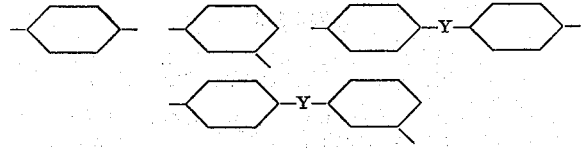

and

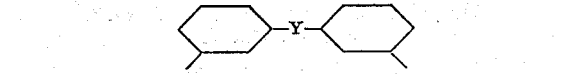

wherein Y represents a divalent radical selected from the group consisting of

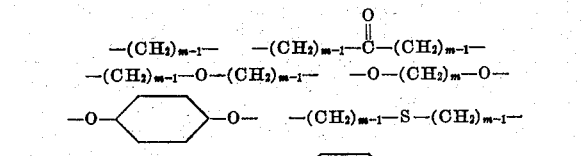

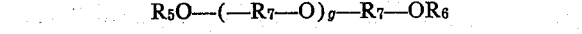

and

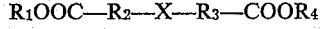

wherein m is a positive integer of from 1 to 5 inclusive, (B) with an alpha, omega-dioxy compound selected from the group consisting of those compounds having the following formulas:

R₅—O—(CH₂)$_p$—O—R₆ and

R₅O—(—R₇—O)$_q$—R₇—OR₆ wherein p represents a positive integer of from 2 to 12 inclusive R₅ and R₆ each represents a substituent selected from the group consisting of a hydrogen atom and an acyl radical containing from 2 to 4 carbon atoms, R₇ represents an alkylene radical containing from 2 to 4 carbon atoms and q represents a positive integer of from 1 to 10 inclusive, the alpha, omega-dioxy compound being employed in such a proportion that there is at least an equivalent amount of alpha and omega oxy substituents in proportion to the carbalkoxy substituents in the overall combination of the aromatic diesters and the alpha, omega-dioxy compounds, (C) in the presence of a condensing agent selected from the group consisting of the novel catalysts set forth above, (D) at an elevated temperature which is increased gradually during the course of the condensation up to a temperature of from about 225° to about 310° C., (E) the condensation being conducted in an inert atmosphere, (F) and conducting the condensation at a very low pressure of the inert atmosphere during the latter part of the condensation.

Advantageously, the condensing agent is employed in an amount of from about 0.005% to about 0.2% based on the weight of the aromatic dicarboxylic acid diester. Higher and lower proportions can also be employed.

Advantageously, the alpha, omega-dioxy compound is employed in such a proportion that there are from about 1.2 to about 3 alpha and omega oxy substituents in proportion to the carbalkoxy substituents in the overall combination of the aromatic diesters and the alpha, omega-dioxy compounds. Higher (e. g. 10) and lower (e. g. 1) proportions can also be employed.

Since the alpha, omega-dioxy compounds which can be employed in accordance with this invention are most advantageously alpha, omega-dihydroxy compounds and in order to facilitate the phraseology which is employed in this specification, such compounds will hereinafter be referred to as polyhydroxy or dihydroxy compounds although it is to be understood that the alpha, omega-dioxy compounds of the type described above are intended to be covered by the term dihydroxy compounds or the term polyhydroxy compounds as such terms are employed herein.

Advantageously, the temperature employed during the earlier part of the condensation is from about 150° to about 220° C. Higher and lower temperatures can also be employed.

Advantageously, the low pressure defined under (F) is less than about 15 mm. of Hg pressure (preferably less than 5 mm.). However, somewhat higher pressures can also be employed.

Most advantageously, the aromatic dicarboxylic acid diester is a diester of p,p'-sulfonyl dibenzoic acid or terephthalic acid and the polyhydroxy compound is a polymethylene glycol.

This invention also includes processes as described above whereby polyesters can be prepared by replacing a part of the described aromatic dibasic acid diester with an ester of a replacement acid which can be an aliphatic dibasic acid, e. g. carbonic acid, oxalic acid, succinic acid, adipic acid, sebacic acid, α,α-dimethylglutaric acid, dimethylamalonic acid, diglycollic acid, β-oxydipropionic acid, γ-oxydibutyric acid, maleic acid, fumaric acid, itaconic acid, etc. Similarly, other esterified acidic modifiers can also be incorporated in conjunction with or in lieu of these replacement acid esters, e. g. linoleic acid, linolenic acid, fatty acids of linseed oil, soybean oil, cottonseed oil, tung oil, etc. The process described above for the general practice of this invention need not be appreciably modified when such partial replacement acid esters are employed in conjunction with the aromatic dibasic acid esters except when they are unsaturated and tend to form insoluble and infusible products due to cross-linkage effects, in which event the process described hereinabove is advantageously terminated at an intermediate temperature of about 250° C. before the pressure is reduced whereby products are obtained which can be called soluble intermediate polyesters which are useful in preparing protective coatings. The various polyesters containing replacement acid esters as described in this paragraph can be prepared according to procedures similar to those described in copending applications filed on even date herewith by J. R. Caldwell, Serial Nos. 313,062–313,066.

Polyesters can also be prepared in accordance with this invention by replacing a part of the described dihydroxy compound with what can be called a polyhydroxy compound which contains 3 or more hydroxy radicals, e. g. glycerol, sorbitol, pentaerythritol, dipentaerythritol, β-methylglycerol, 2-methyl-2-hydroxymethyl-1,3-propanediol, 1,2,4-trihydroxybutane, etc. In the preparation of polyesters employing these polyhydroxy compounds, the reaction mixture is not generally heated to the high temperatures under reduced pressure as described hereinabove since the product would become insoluble and infusible due to cross-linking of the molecules; hence, the process is halted at about 250° C. or less prior to the reduction in the pressure of the inert atmosphere. Various solutions can then be prepared from these soluble polyester products which can then be cast into films or otherwise used in protective coating compositions. In preparing such soluble polyesters it is generally advantageous to employ an unsaturated aliphatic dibasic acid diester in lieu of a part of the described aromatic dibasic acid diesters, e. g. maleic, fumaric and itaconic diesters. The various polyesters containing replacement polyhydroxy compounds as described in this paragraph can be prepared according to procedures similar to those described in a copending application filed on even date herewith by J. R. Caldwell, Serial No. 313,069.

The dihydroxy or polyhydroxy compounds defined above may not actually contain any free hydroxy radicals since they may be in esterified form as indicated by the formulas of the dihydroxy compounds set forth above. However, these hydroxy or substituted hydroxy radicals are referred to generally as hydroxy radicals or substituents. Each diester is considered as containing two carbalkoxy radicals as that term is employed in the definition of the process as described above since $R_1$ and $R_4$ may be alkyl radicals, or omega-hydroxyalkyl radicals. Even when the process is preceded by the preliminary step described below employing free acids, the term carbalkoxy radicals in the description of the process is intended to encompass such free carboxy radicals.

Furthermore, this invention covers processes as defined above wherein the aromatic dicarboxylic acid diester is formed by a preliminary step comprising condensing an aromatic dicarboxylic acid having the formula:

$$HOOC-R_2-X-R_3-COOH$$

(wherein $R_2$, $R_3$ and X are defined under (A) in the above-described process), with a polyhydroxy compound which is defined above under (B) and is employed in the proportions set forth under (B), at an elevated temperature, after which preliminary step the novel catalytic condensing agent which is defined under (C) is added and the condensation is completed as defined under (D), (E) and (F). Advantageously, the elevated temperature employed during the preliminary step is substantially that at which reflux conditions subsist; however, higher and lower temperatures can also be used. Advantageously, as indicated hereinbefore, the polyhydroxy compound is employed in such a proportion that there are from about 1.2 to about 3 hydroxy substituents in proportion to the acid substituents in the overall combination of the aromatic diester and the polyhydroxy compound.

In preparing polyesters, especially linear highly polymeric polyesters, it is important to exclude oxygen and moisture at all stages of the condensation, particularly during the latter stages thereof. An inert atmosphere is employed to exclude oxygen; such atmospheres include helium, hydrogen, nitrogen, etc. The reacting materials employed in the condensation are advantageously substantially anhydrous; however, if water is initially present or is formed during the course of the condensation, it can be substantially completely removed prior to the final stages of the condensation by operating in accordance with the specified process or otherwise.

Examples of aromatic dicarboxylic acid diesters which can be employed as defined above under (A) include the β-hydroxyethyl diester of p,p'-sulfonyl dibenzoic acid, p,p'-sulfonyl dibenzoic acid dibutyl ester, m,p'-sulfonyl dibenzoic acid dipropyl ester, m,m'-sulfonyl dibenzoic acid dihexyl ester, methyl terephthalate, hexyl terephthalate, isopropyl terephthalate, as well as various esters having the following formulas:

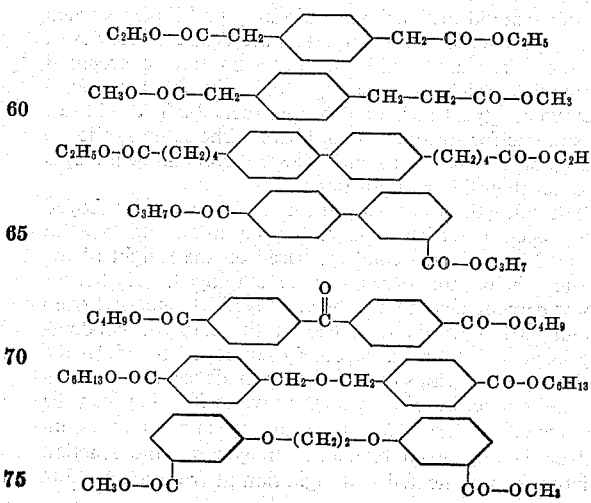

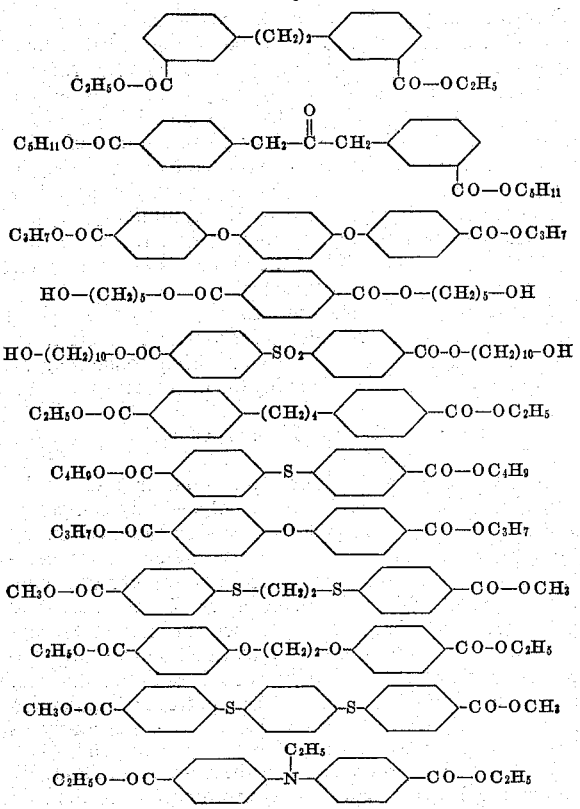

et cetera.

The dihydroxy compounds which can be employed to form highly polymeric linear polyesters are straight-chain alkane diols, viz. polymethylene glycols, wherein the hydroxy radicals are positioned at the two ends of the alkylene chain. Examples of such glycols include ethylene glycol, 1,3-propylene glycol, 1,4-butylene glycol, 1,6-hexylene glycol, 1,10-decamethylene glycol, 1,12-dodecamethylene glycol, etc. As indicated above, mono or diesters of these glycols can also be employed. Thus, the acetates, propionates and butyrates are examples of such esters. The defined ether glycols can be employed either in lieu of the polymethylene glycols or in conjunction therewith as modifiers. Examples of ether glycols include diethylene glycol, triethylene glycol, tetraethylene glycol, bis (4-hydroxybutyl) ether, bis (3-hydroxypropyl) ether, etc.

Valuable fibers can be advantageously prepared employing the higher melting polyesters which can be produced according to the procedures described herein. Preferably no aliphatic ether glycol is employed when fibers are to be prepared. Furthermore, the aromatic acid diesters should ordinarily contain only p,p′ linkages when highly polymeric linear polyesters are desired. However, on the other hand, valuable polyesters can be prepared employing aliphatic ether glycols without any polymethylene glycol although the product obtained will not be suitable for forming useful fibers. The same applies to the employment of aromatic diesters containing linkages in other than the para positions.

The catalytic condensing agents which can be employed have been described above. From about 0.005% to about 0.2% of such catalysts based on the weight of the diesters being condensed can be employed. Higher or lower percentages can also be employed. Generally, from about 0.01% to about 0.06% of the catalytic condensing agent can be advantageously employed based on the weight of the various diesters being condensed.

The temperature at which polyesterification can be conducted is dependent upon the specific reactants involved in any given reaction. In general, the reaction mixture can be heated with agitation at from about 150° to about 220° C. for from approximately one to three hours in an inert atmosphere (e. g. nitrogen or hydrogen); the mixture can then be heated with agitation at from about 225°-240° to about 280°-310° C. in the same atmosphere for approximately 1 to 2 hours. Finally, the pressure can be greatly reduced to form a vacuum (less than about 15 mm. of Hg pressure but preferably on the order of less than 5 mm. of Hg pressure) while the temperature is maintained in the same range (225°-310° C.); these conditions are advantageously maintained for approximately 1 to 6 additional hours. This final phase is advantageously carried out with good agitation under the high vacuum in order to facilitate the escape of volatile products from the highly viscous melt. The conditions can be varied considerably depending upon the degree of polyesterification desired, the ultimate properties sought, the stability of the polyester being produced, and the use for which the product is intended.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc., can be used as the reaction medium.

It is important to exclude oxygen and moisture at all stages of the condensation reaction. Inert atmospheres which can be advantageously employed include nitrogen, hydrogen, helium, etc. Good agitation is provided during the polyesterification process. Substantially anhydrous reactants can be advantageously employed although this is not essential, especially if any water is removed in the earlier stages of the condensation.

In the examples given below, the hot bar sticking temperature is referred to in several instances. The hot bar sticking test can be briefly described as follows: A polyester fiber is placed on the flat surface of a heated bar and a weight of 100 grams is applied to the fiber along a distance of ⅝ inch of the fiber length. The contact surface of this weight has a coating of polytetrafluoroethylene which acts as a thermal insulator. The fiber is allowed to remain in contact with the bar under this weight for one minute. The minimum temperature at which the fiber adheres to the hot bar under these conditions, is the sticking temperature as that term is employed in the examples given herein.

This invention can be further illustrated by the following examples; in addition to these examples it is apparent that other variations and modifications thereof can be adapted to obtain similar results:

*Example 1.—Methyl magnesium iodide as the catalyst*

Thirty-eight and eight-tenths grams of methyl terephthalate, thirty-eight and eight-tenths grams of methyl isophthalate and forty-nine and six-tenths grams of ethylene glycol were placed in a flask with stirrer, gas inlet tube, and exit tube. The flask was flushed out with hydrogen, heated in a metal bath to 180° C. and then 0.2 cc. of catalyst was added. The catalyst was prepared by reacting 20 grams of magnesium with 75 cc. methyl iodide in 250 cc. dibutyl ether; the reactants were heated under reflux until the magnesium was in solution and then filtered through sintered glass. After the catalyst had been added to the esters and glycol, the reaction mixture was heated under a stream of hydrogen with stirring at 180° for 2 hours. At the end of this period the theoretical amount of methanol had been evolved. The temperature was then raised to 250° and maintained there for ¾ hour. A vacuum of less than one millimeter of mercury was then applied, and, with continued stirring, the melt was heated at 250° for four hours. The product was a high molecular weight polyester with an intrinsic viscosity in a mixture of 60% phenol and 40% sym. tetrachloroethane of 0.42. The polyester can be spun into fibers which can be cold-drawn 300–400 per cent.

*Example 2.—Methyl magnesium iodide as the catalyst*

One hundred sixty-seven and two-tenths grams of the butyl ester of p,p'-sulfonyl-dibenzoic acid, 49.6 g. of ethylene glycol, and 41.2 g. of diethylene glycol together with 0.5 cc. of the catalyst prepared as in the preceding example were heated with stirring under hydrogen at 195° for 2 hours, then at 280° for 1 hour, and finally under a vacuum of less than 1 mm. of mercury for 3 hours. The product was a light-colored, very tough polymer which can be spun to a fiber which can be cold-drawn 300–400 per cent and which has an intrinsic viscosity in a 60–40 mixture of phenol-tetrachloroethane of 0.6.

*Example 3.—Ethyl magnesium iodide as the catalyst*

A catalyst was prepared by reacting 20 grams of magnesium metal with 75 cc. ethyl iodide in 250 cc. dry diethyl ether. Two-tenths of one cc. of this catalyst were added to a mixture of 83.6 g. of the butyl ester of p,p'-sulfonyl-dibenzoic acid, 46 g. dimethyl sebacate and 100 g. ethylene glycol. The mixture was heated under hydrogen with stirring at 190° for 3 hours at the end of which period the theoretical amounts of alcohols had been evolved. It was then heated at 295° and under hydrogen for ½ hour. It was finally heated in a vacuum of less than one millimeter of mercury for 2 hours. The product was a pure white, exceedingly tough elastic polymer with an intrinsic viscosity of 0.5 in phenol-tetrachloroethane.

*Example 4.—Ethyl magnesium bromide as the catalyst*

A catalyst was prepared by reacting 20 grams of magnesium with 130 g. ethyl bromide in 250 cc. dibutyl ether. Two-tenths of one cc. of this catalyst was added to a mixture of 41.8 g. of the butyl ester of p,p'-sulfonyl-dibenzoic acid, 17.7 g. hexamethylene glycol, and 9.3 g. ethylene glycol. The reaction mixture was heated under a stream of hydrogen with constant stirring at 190° for 2 hours and at 280° for ¾ hour. It was then heated under vacuum of 1 mm. of mercury for 5 hours. The product was a high molecular weight polymer which can be spun and cold drawn and has a viscosity of 0.6 in phenol-tetrachloroethane.

*Example 5.—Phenyl magnesium bromide as the catalyst*

A catalyst was prepared by reacting 2 grams magnesium with 17.5 bromobenzene in 25 cc. dibutyl ether. Two-tenths of one cc. of this catalyst was added to a mixture of 180 g. methyl terephthalate and 92 g. ethylene glycol. The mixture was heated under nitrogen and with constant stirring at 200° for 4 hours, and then at 280° for one hour. Finally it was heated at 280° under a vacuum of 1 mm. of mercury for 5 hours. The product was a white polyester with an intrinsic viscosity in phenol-tetrachloroethane of 0.7.

*Example 6.—Propyl magnesium chloride as the catalyst*

A catalyst was prepared by reacting 2 grams magnesium with 9 g. propyl chloride in 25 cc. dibutyl ether. Two-tenths of one cc. of this catalyst was added to a mixture of 41.8 g. of the butyl ester of sulfonyl-4,4'-dibenzoic acid and 50 g. diethylene glycol. The mixture was heated under hydrogen with constant stirring at a temperature of 200° for 5 hours, and at 250° for 1 hour. It was then heated in a vacuum of 1 mm. of mercury for 5 hours. A polyester was produced with an intrinsic viscosity in 60–40 phenol-tetrachloroethane of 0.8.

*Example 7.—Methyl magnesium iodide as the catalyst*

Four hundred and twenty grams (1.0 mol) p,p'-sulfonyl dibenzoic acid dibutyl ester, 300 grams (1.3 mol) methyl sebacate, and 250 g. (4.0 mols) ethylene glycol were placed in a reaction vessel equipped with a stirrer, short distillation column, and an inlet for purified hydrogen. Methyl magnesium iodide (0.2 g.) dissolved in 10 cc. butyl ether was added as catalyst. The mixture was stirred at 180–190° C. for 6 hours to remove methyl and butyl alcohols as they formed by ester interchange. The temperature was then raised to 285–290° C. during a period of 1 hour. A vacuum of 0.5 to 1.0 mm. was applied for 3 to 4 hours while the temperature was maintained at 285–290° C. The product obtained is colorless and has an inherent viscosity of 0.7 to 60% phenol–40% tetrachloroethane. The polyester can be molded in an injection press to give shaped objects that have a very high impact strength. They retain their shape up to a temperature of 220–230° C. They also show good flexibility at temperatures of −30° to −40° C. This polyester is especially valuable for extrusion as tubes, sheets, or rods. Fibers can be spun from the polyester by melt-extrusion methods. After drafting and heat-treating, the fibers have a strength of 2.5 to 3.0 grams per denier and a reversible elongation of 20 to 30%.

*Example 8.—Methyl magnesium iodide as the catalyst*

Three hundred and seventy-two g. (1.0 mol) p,p'-sulfonyl-dibenzoic acid diethyl ester and 250 g. (1.5 mol) bis(4-hydroxybutyl) ether were placed in a rection vessel equipped with a stirrer, an inlet for purified nitrogen, and a short distillation column. A solution of 0.3 g. methyl magnesium iodide in 10 cc. ethyl ether was added as catalyst. The reaction mixture was stirred at 200–210° C. until 80–90% of the ethyl alcohol had distilled. An atmosphere of purified nitrogen was maintained in the vessel. The temperature was then raised to 240–250° C. and held for 1.5 to 2 hours. A vacuum of 2 to 3 mm. was applied and the melt stirred for 8 hours. The polymer obtained softens at 160–170° C. It can be extruded in the form of sheets, rods, tubes, etc. It can be molded by injection and compression methods.

*Example 9.—Tolyl magnesium iodide as the catalyst*

The apparatus described in Example 8 was employed to condense the same reactants described therein according to the same procedure except that an equal weight of tolyl magnesium iodide was employed as the catalyst. The polyester obtained had the properties described in Example 8.

*Example 10.—Methyl magnesium iodide as the catalyst*

One gram mole of p,p'-dicarbethoxy-diphenyl methane and 2 gram moles of ethylene glycol were condensed in apparatus as described in Example 1 according to the procedure set forth therein employing 0.2 cc. of the same catalyst. The product obtained was a highly polymeric linear polyester useful in preparing molding resins, films, sheets, etc.

*Example 11.—Methyl magnesium iodide as the catalyst*

One gram mole of p,p'-dicarbomethyoxybenzophenone and 2.3 gram moles of trimethylene glycol were condensed in apparatus as described in Example 1 according to the procedure set forth therein employing 0.1 gram of the same catalyst. The product obtained was a highly polymeric linear polyester useful in preparing molding resins, films, sheets, etc.

*Example 12.—Methyl magnesium iodide as the catalyst*

One gram mole of 1,2-bis (p-carbopropoxyphenyloxy) ethane and 2.4 gram moles of ethylene glycol were condensed in apparatus as described in Example 1 according to the procedure set forth therein employing 0.1 gram of the same catalyst. The product obtained was a highly polymeric linear polyester useful in preparing molding resins, films, sheets, etc.

Polyesters similar to those described in the above examples can be prepared employing 1,4-bis (p-carbamyloxyphenoxy) benzene, bis (p-carbethoxyphenyl) sulfide, p,p' dicarbethoxybiphenyl, and N,N-bis (p-carbohexoxyphenyl) methylamine, condensed with ethylene glycol, tetramethylene glycol and hexamethylene glycol.

In the various formulas given for the catalysts in the above examples, $C_4H_9$ and the formulas for other such alkyl radicals are intended to represent the straight chain alkyl radicals. However, branched chain radicals can also be employed.

I claim:

1. A process for preparing a polyester comprising (A) condensing under substantially anhydrous conditions an aromatic dicarboxylic acid diester having the formula:

$$R_1OOC—R_2—X—R_3—COOR_4$$

wherein $R_1$ and $R_4$ each represents a substituent selected from the group consisting of an alkyl radical containing from 1 to 10 carbon atoms and an omega-hydroxyalkyl radical containing from 2 to 12 carbon atoms, $R_2$ and $R_3$ each represents $(CH_2)_{n-1}$ wherein $n$ is a positive integer of from 1 to 5 inclusive, and X represents a divalent aromatic radical selected from the group consisting of those having the following formulas:

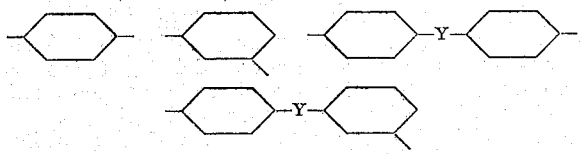

and

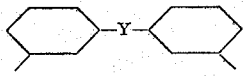

wherein Y represents a divalent radical selected from the group consisting of

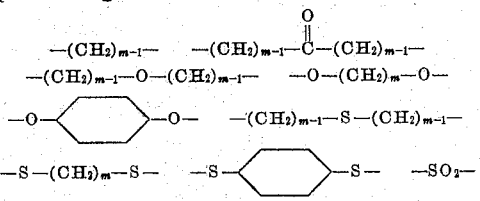

and

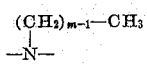

wherein $m$ is a positive integer of from 1 to 5 inclusive, (B) with an alpha, omega-dioxy compound comprising a dihydroxy compound selected from the group consisting of those compounds having the following formulas:

$$R_5—O—(CH_2)_p—O—R_6$$

and $$R_5—O—(—R_7—O)_q—R_7—OR_6$$

wherein $p$ represents a positive integer of from 2 to 12 inclusive, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive, the alpha, omega-dioxy compound being employed in such a proportion that there is at least an equivalent amount of alpha and omega oxy substituents in proportion to the carbalkoxy substituents in the overall combination of the aromatic diester and the alpha, omega-dioxy compound, (C) in the presence of a catalytic condensing agent selected from the group consisting of compounds having the following formula:

$$RMgHal$$

wherein R represents a substituent from the group consisting of an aryl radical containing from 6 to 9 carbon atoms and an alkyl radical containing from 1 to 6 carbon atoms and Hal represents a halogen atom, (D) at an elevated temperature which is increased gradually during the course of the condensation up to a temperature of from 225° to about 310° C., (E) the condensation being conducted in an inert atmosphere, (F) and conducting the condensation at a very low pressure of the inert atmosphere during the latter part of the condensation.

2. A process as defined in claim 1 wherein the condensing agent is employed in an amount of from about 0.005% to about 0.2% based on the weight of the aromatic dicarboxylic acid diester.

3. A process as defined in claim 2 wherein the alpha, omega-dioxy compound is employed in such a proportion that there are from about 1.2 to about 3 alpha and omega oxy substituents in proportion to the carbalkoxy substituents in the overall combination of the aromatic diester and the alpha, omega-dioxy compound.

4. A process as defined in claim 3 wherein the elevated temperature employed during the earlier part of the condensation is from about 150° C. to about 220° C.

5. A process as defined in claim 4 wherein the low pressure defined under (F) is less than 15 mm. of Hg pressure.

6. A process as defined in claim 5 wherein the low pressure defined under (F) is less than 5 mm. of Hg pressure.

7. A process as defined in claim 6 wherein the aromatic diester is derived from p,p'-sulfonyl dibenzoic acid and the condensing agent is $CH_3MgI$.

8. A process as defined in claim 6 wherein the aromatic diester is derived from p,p'-sulfonyl dibenzoic acid and the condensing agent is $C_2H_5MgI$.

9. A process as defined in claim 6 wherein the aromatic diester is derived from p,p'-sulfonyl dibenzoic acid and the condensing agent is $C_2H_5MgBr$.

10. A process as defined in claim 6 wherein the aromatic diester is derived from terephthalic acid and the condensing agent is $C_3H_7MgCl$.

11. A process as defined in claim 6 wherein the aromatic diester is derived from terephthalic acid and the condensing agent is phenyl magnesium bromide.

12. A process as defined in claim 1 wherein the aromatic dicarboxylic acid diester is formed by a preliminary step comprising condensing an aromatic dicarboxylic acid having the formula:

$$HOOC—R_2—X—R_3—COOH$$

wherein $R_2$, $R_3$ and X are defined under (A), with an alpha, omega-dioxy compound which is defined under (B) and is employed in the proportions set forth under (B), at an elevated temperature, after which preliminary step the catalytic condensing agent which is defined under (C) is added and the condensation is completed as defined under (D), (E) and (F).

13. A process as defined in claim 12 wherein the elevated temperature employed during the preliminary step is substantially that at which reflux conditions subsist, and the condensing agent is employed in an amount of from about 0.005% to about 0.2% based on the weight of the aromatic dicarboxylic acid diester, the alpha, omega-dioxy compound is employed in such a proportion that there are from about 1.2 to about 3 alpha and omega oxy substituents in proportion to the acid substituents in the overall combination of the aromatic diester and the alpha, omega-dioxy compound, the elevated temperature employed during the earlier part of the condensation to form the polyester is from about 150° C. to about 220° C., the low pressure defined under (F) is less than about 15 mm. of Hg pressure and all materials employed in the process are substantially anhydrous.

References Cited in the file of this patent

UNITED STATES PATENTS

| | | |
|---|---|---|
| 2,465,319 | Whinfield | Mar. 22, 1949 |
| 2,614,120 | Caldwell | Oct. 14, 1952 |

OTHER REFERENCES

Reid: Ind. & Eng. Chem., September 1948, pp. 1596–97.

Hauser et al.: J. Am. Chem. Soc. 70, 606–8, 1948 (Scientific Library).

Beilstein: vol. 4 (1922), pages 655, 662; vol. 16 (1933), page 934.

Karrer: Org. Chem., pages 133–34, 1938.